(No Model.)

W. DE LANY.
BICYCLE.

No. 545,948. Patented Sept. 10, 1895.

Witnesses:
Sidney P. Hollingsworth
C. W. Brooke

Inventor:
WILLIAM DE LANY
by his attorneys,
Baldwin Davidson & Wight

UNITED STATES PATENT OFFICE.

WILLIAM DE LANY, OF COBOURG, CANADA.

BICYCLE.

SPECIFICATION forming part of Letters Patent No. 545,948, dated September 10, 1895.

Application filed April 11, 1895. Serial No. 545,368. (No model.)

*To all whom it may concern:*

Be it known that I, WILLIAM DE LANY, a subject of the Queen of Great Britain, residing at Cobourg, in the county of Northumberland, Province of Ontario, Canada, have invented certain new and useful Improvements in Bicycles, of which the following is a specification.

My invention relates particularly to the steering-gear of bicycles, and my object is to provide a simple and strong connection between the fork-stem and the forks; also, to provide a ready means for disconnecting and removing the forks from the parts to which they are normally connected.

Figure 1:
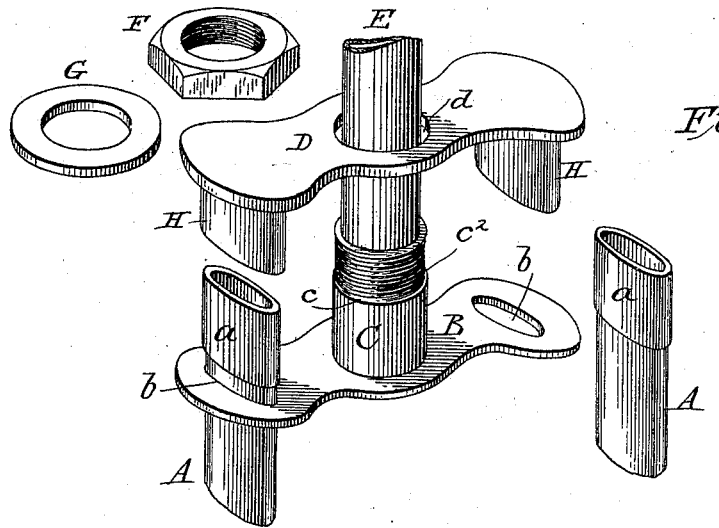
Figure 2:
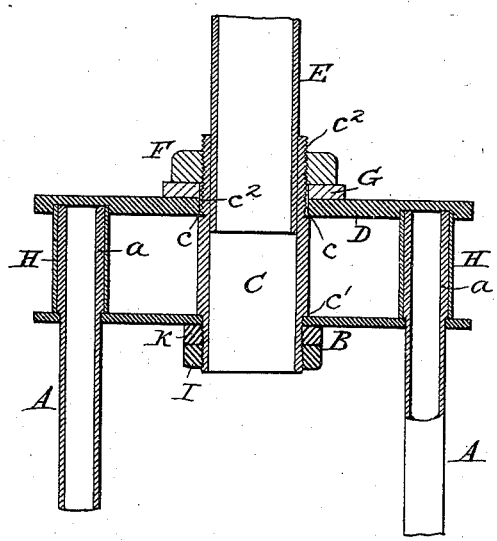

In the accompanying drawings, illustrating my invention, Figure 1 is a view of the devices which I employ for connecting the forks with the fork-stem, the several parts being separated to more clearly show their construction; and Fig. 2 is a vertical central section through these connecting devices, showing the parts assembled and clearly indicating how the upper ends of the forks are connected with the fork-stem of the handles.

The forks A may be in the main of usual construction. At the upper end, however, each fork is formed with an enlargement or head $a$. The forks may be connected with the axle of the front wheel in any suitable way. Before connecting them with the axle, however, they are passed through perforations $b$ at opposite ends of a connecting-plate B. The lower ends or shoulders of the heads $a$ rest upon the top of the plate B. To the plate B is secured a sleeve C, which extends through a central opening in the plate and is formed with a screw-thread to receive nuts I K, which may be right and left hand nuts, if desired, to more securely connect the sleeve C with the plate B. The sleeve extends upwardly from the plate B and is connected with a tube or pipe E, to which handles may be applied in any approved way.

The drawings, Fig. 2, show the pipe E as extending part way into the sleeve C; but the pipe E may extend entirely through the sleeve C, or the sleeve C may be made integrally with the pipe E. A crown-plate D, similar in shape to the plate B and arranged directly above it, is provided with a central opening $d$, through which the sleeve C extends. The sleeve may, however, be shouldered at $c$ in a similar manner to the way in which it is shouldered at $c'$ at its lower end, thus forming a spacing device between the plates B and D. The sleeve is screw-threaded at $c^2$ to receive a clamp-nut F, which bears on a washer G, interposed between the nut and the crown-plate. When the nut is withdrawn from the screw-thread, the crown-plate may be lifted and separated from the plate B. When the nut is tightened, a secure connection is made between the two plates. The crown-plate at opposite ends is provided with socket-pieces H, similar in construction and adapted to fit over the enlarged ends or heads $a$ of the forks. The socket-pieces extend up into the body of the crown-plate D. They are not merely soldered to the under edge thereof, but are preferably brazed to the crown-piece, being let into recesses formed in the under side thereof, as clearly shown in Fig. 2. I thus provide a strong, steady, and rigid connection between the fork-stem and the forks, and one which permits of the ready separation of the parts and removal of the forks without unsoldering, cutting, distorting, or in any way injuring any of the parts. The socket-pieces correspond in length to the distance between the shoulders $c$ and $c'$—that is, these parts are all made so as to hold the crown-plate at a predetermined distance from the bottom plate, all the parts being so organized as to fit snugly and prevent any movement or springing after the tightening devices are applied. When it is desired to remove the forks, the nuts I and K are taken off and the plate B, with the forks and the wheel, is lowered or separated from the fork-stem. After the plate B is lowered and the forks are lowered they may be withdrawn separately and repaired or replaced. The construction is such, also, that by removing the nut F and washer G the crown-piece may be lifted and the forks raised and removed without removing the plate B; but I prefer the other way of separating the parts, because I can then remove the forks without disturbing the ball-bearing above the crown-plate.

I claim as my invention—

1. The combination with the forks of a bicycle, of the fork stem, the connecting plate B, perforated at opposite ends and through which the forks extend, the crown plate D with which the forks have a sliding connection, and devices for detachably connecting the two plates together, substantially as described.

2. The combination with the forks of a bicycle, of the fork stem, plates connecting the fork stem with the upper ends of the forks, and a nut on the fork stem for tightening the connection between the forks and the plates.

3. The combination of the forks having headed upper ends, the fork stem, plates separated from each other as described by the heads of the fork, and a nut on the fork stem for tightly connecting the two plates and holding the forks rigidly in position.

4. The combination of the headed forks, the fork stem, the lower plate arranged under the shoulders of the heads of the forks, the crown plate having socket pieces extending over the heads of the forks, the handle standard secured to the lower plate and passing through the crown plate, and a nut on the fork stem for tightening the connection between it and the plates.

In testimony whereof I have hereunto subscribed my name.

WILLIAM DE LANY.

Witnesses:
A. J. ARMSTRONG,
C. L. TREBILCOCK.